United States Patent [19]

Schulze et al.

[11] 4,332,720
[45] Jun. 1, 1982

[54] N,N'-POLYOXYALKYLENE BIS(LACTAM CARBOXYLIC ACIDS)

[75] Inventors: Heinz Schulze; Robert L. Zimmerman; Harold G. Waddill, all of Austin, Tex.

[73] Assignee: Texaco Development Corporation, White Plains, N.Y.

[21] Appl. No.: 847,642

[22] Filed: Nov. 1, 1977

Related U.S. Application Data

[63] Continuation-in-part of Ser. No. 689,409, May 24, 1976, abandoned.

[51] Int. Cl.$^3$ .............. C07D 207/277; C07D 211/78; C07D 223/10; C07D 227/087
[52] U.S. Cl. .................. 260/239.3 R; 260/326.25; 521/128; 546/188; 546/208; 564/505; 548/519
[58] Field of Search ................. 260/326.25, 239.3 R; 546/188, 208

[56] References Cited

U.S. PATENT DOCUMENTS

| 2,683,147 | 7/1954  | Girod ........................... 546/188    |
| 2,708,206 | 5/1955  | Girod ........................... 260/326.25 |
| 2,708,207 | 5/1955  | Girod ........................... 546/188    |
| 2,993,021 | 7/1961  | Bavley et al. ................. 260/326.25   |
| 3,354,178 | 11/1967 | Dickenson ..................... 546/188      |
| 3,431,271 | 3/1969  | Loo, Jr. ........................ 260/326.25 |
| 3,843,684 | 10/1974 | Randale ......................... 260/326.25 |
| 3,940,363 | 2/1976  | Murayama et al. .............. 546/188       |
| 4,174,443 | 11/1979 | Dalton .......................... 260/326.25 |

*Primary Examiner*—Alton D. Rollins
*Attorney, Agent, or Firm*—Carl G. Ries; Robert A. Kulason; Carl G. Seutter

[57] ABSTRACT

Compounds typified by N,N'-polyoxyalkylene bis (pyrrolidinone-3-carboxylic acid) are useful as epoxy curing accelerators. Salts thereof, including alkali metal salts, are curing agents for isocyanurate foams.

9 Claims, No Drawings

N,N'-POLYOXYALKYLENE BIS(LACTAM CARBOXYLIC ACIDS)

RELATED APPLICATION

This application is a continuation-in-part of Ser. No. 689,409 filed May 24, 1976, abandoned.

FIELD OF THE INVENTION

This invention relates to novel products particularly characterized by their use as curing agents for epoxy resins or isocyanurate foams or as accelerators for curable epoxy resins.

BACKGROUND OF THE INVENTION

As is well known to those skilled in the art, epoxy resins may be cured by the use of aromatic amines such as (i) methylene dianiline, (ii) the polymeric condensation product of aniline and formaldehyde, etc. Typical prior art curing, at elevated temperatures of 80° C. or higher, yields products which are resistant to attack by chemicals, solvents, etc. Curing of epoxy resins at ambient temperature however yields product coatings which are undercured, brittle, without strength, and readily attacked by many chemicals and solvents.

It is an object of this invention to provide novel products which may be used in curing systems. Other objects will be apparent to those skilled in the art.

STATEMENT OF THE INVENTION

In accordance with certain of its aspects, this invention is directed to novel products

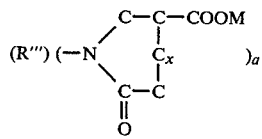

wherein x is an integer 0-2, a is an integer of at least 2; M is hydrogen, alkali metal, or quaternary ammonium when x is 0, 1 or 2; $R'''$ is a polyoxyalkylene chain having terminal carbon atoms to which the nitrogen atoms are bonded; and the molecular weight of $R'''$ is 200-2100, except that the molecular weight of $R'''$ is 300-2100 when x is 0 and M is hydrogen.

In accordance with certain of its other aspects, this invention is directed to a method of curing an uncured epoxy resin in the presence of aromatic curing agent and 1-15 parts of an accelerator

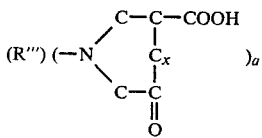

wherein x is an integer of 0-2; a is an integer of at least 2; $R'''$ is a polyoxyalkylene chain having terminal carbon atoms to which the nitrogen atoms are bonded; and the molecular weight of $R'''$ is 200-2100.

In accordance with certain of its other aspects this invention is directed to a method of preparing cured isocyanurate foam which comprises reacting an isocyanate with a polyol having at least two active Zerewitinoff-active hydrogen atoms in the presence of a blowing agent thereby forming a polyisocyanurate foam; and conducting said reaction in the presence of 0.5-10 parts (per 100 parts of total formulation) of a curing agent

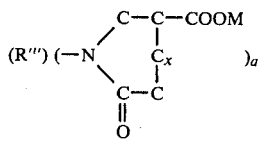

wherein x is an integer 0-2; a is an integer at least 2; M is alkali metal or quaternary ammonium; $R'''$ is a polyoxyalkylene chain, of a molecular weight of about 200-2100, having terminal carbon atoms to which the nitrogen atoms are bonded.

DESCRIPTION OF THE INVENTION

The charge unsaturated carboxylic acids which may be used in practice of the process of this invention are characterized by the formula:

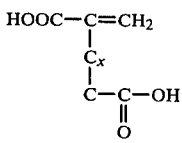

wherein x is an integer 0-2. Valence bonds in this structure, or in others in this specification, may be filled with hydrogen or with inert substituents which do not interfere with the reaction.

When x is 2, the acid may be represented by the formula (typified by alpha-methylene adipic acid):

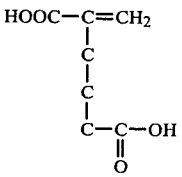

When x is 1, the acid may be represented by the formula (typified by alpha-methylene glutaric acid):

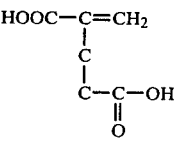

When x is 0, the acid may be represented by the formula (typified by itaconic acid):

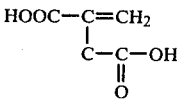

In the preferred acid, x is zero. The preferred acid is thus itaconic acid.

The polyoxyalkylene polyamines which may be used in practice of the process of this invention are characterized by the formula

wherein a is an integer preferably 2-3 and R''' is a polyoxyalkylene chain of molecular weight 200-2100 having a terminal carbon atoms to which the nitrogen atoms are bonded.

As will be apparent herein, in certain instances R''' will preferably have a molecular weight of 300-2100, and in certain instances more preferably 400-2100.

When a is 3, an illustrative compound of molecular weight of about 400 may be

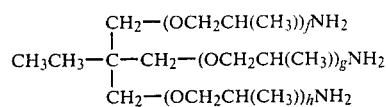

wherein f plus g plus h is 5.3 typically as available under the trademark Jeffamine T-403 of Jefferson Chemical Company.

The preferred amines which may be used in practice of the process of this invention are polyoxyalkylene diamines characterized by the formula:

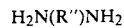

wherein R'' is a polyoxyalkylene chain of molecular weight of about 200-2100 having terminal carbon atoms to which the nitrogen atoms are bonded.

As will be apparent herein, in certain instances R''' will preferably have a molecular weight of 300-2100, and in certain instances more preferably 400-2100. R'' is derived from an oxyalkylene group, typified by oxyethylene —$CH_2CH_2O$—, oxypropylene —$OCH_2CH(CH_3)$— etc. R'' may also be a polyoxyethylene bearing an added polyoxypropylene (as in the compositions marketed by Jefferson Chemical Co. under the trademark Jeffamine ED-series) typified by

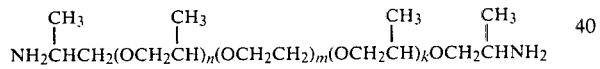

Typical of the polyoxyalkylene diamines which may be used in practice of the process of this invention may be those listed in the table:

TABLE a. The diterminal diamine of polyoxypropylene of molecular weight 427;

b. The diterminal diamine of polyoxypropylene of molecular weight 235;

c. The diterminal diamine of polyoxypropylene of molecular weight 2000;

d. The diterminal diamine of polyoxyethylene of molecular weight 600; etc.

It will be apparent to those skilled in the art that many of the suitable polyoxyalkylene polyamines may be available as and used as commercial mixtures of several components. Useful commercial materials include those available under the trademarks Jeffamine D-, T-, and ED- etc. as marketed by Jefferson Chemical Company.

In practice of the process of this invention, according to certain of its aspects, an equivalent amount of unsaturated carboxylic acid is added to a reaction mixture together with one mole of polyoxyalkylene polyamine. The reaction may be carried out in the absence of added solvent-diluent, but the latter may be present if desired—including water, toluene, etc. Water is preferably added in amount of 50 w%-200 w%, say about 100 w% of the amine.

During the reaction, the reaction mixture is maintained at ring-forming conditions including temperature of 80° C.-200° C., say 100° C. for 4-12 hours, say 8 hours. During this period, the following reaction occurs:

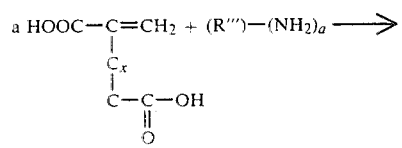

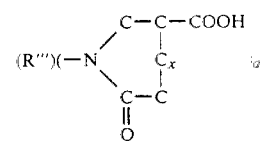

In the case of the preferred diamines, the reaction may be:

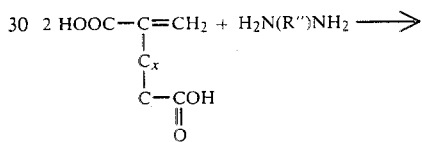

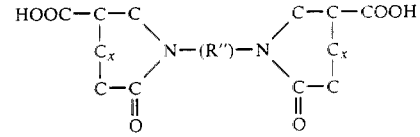

In the case of one preferred embodiment, itaconic acid-polyoxyethylene di-primary amine, the reaction may be:

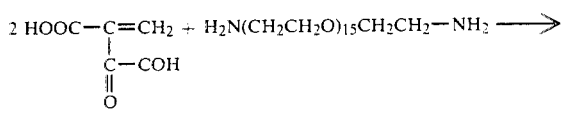

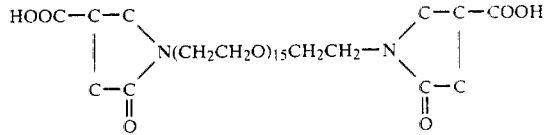

In the case of another preferred embodiment, a specific reaction may be as follows:

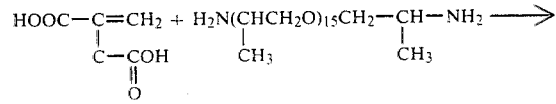

-continued

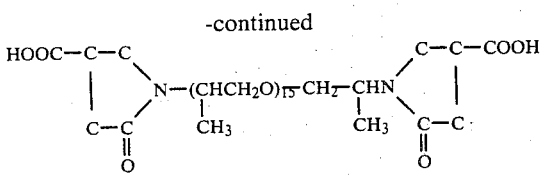

As reaction continues, the water produced by the reaction (in amount of one mole per mole of acid reacted) may be distilled off. If desired, the water may be removed during refluxing by azeotropic distillation with e.g. toluene. Typically at the end of the reaction period, the reaction mixture may be recovered and filtered, preferably in the presence of added filter aid such as Supercell brand.

The product so obtained is preferably worked up by stripping, as in a rotary evaporator at 80° C.-200° C., say 95° C. Stripping may typically be carried out under vacuum of 0.1–50 mm. Hg, say 0.5 mm. Hg.

Yield is about stoichiometric.

Typical product is recovered as composition which (depending on the components from which it is prepared and its molecular weight) may generally be characterized as a clear viscous liquid, a light brown viscous liquid, a tacky resin, etc.

These products are generally characterized by their solubility in alcohols (e.g. benzyl alcohol, ethanol, hexanols, etc). They are particularly characterized by solubility in polymer systems in which they may find use.

These products may be used as recovered or in the form of solutions in e.g. benzyl alcohol. They are particularly characterized by their ability to serve as accelerators for curing epoxy resins.

It is a feature of the process of this invention that the acids prepared by the process of this invention may serve as curing agents for epoxy resins. Salts of the noted acids, particularly the alkali-metal salts or quaternary ammonium salts (either being monobasic, dibasic, or polybasic) serve as curing agents for isocyanurate foam systems. Illustrative salts include the monosodium salts, the di-potassium salts, the di-(tetramethylammonium) salts, the di-(tetraethylammonium) salts etc. The salts may be prepared either by reacting the charge acid in the form of its salt (e.g. di-potassium itaconate) or more preferably by reacting the acid product acid with a base e.g. tetramethylammonium hydroxide or potassium hydroxide.

The dialkali metal salt is preferably prepared by adding to the recovered reaction mixture an equivalent amount of e.g. potassium hydroxide in 5%-30%, say 20% aqueous solution at 20° C.-80° C., say 50° C. After 10-20 minutes, say 15 minutes agitation, the reaction mixture may be filtered through a bed of filter aid and the resulting solution may be used as recovered, e.g. as a 10%-80%, say 50% solution. If desired the salt may be recovered as by evaporation. Both the mono-alkali and the di-alkali metal salts may be recovered.

In practice of certain of its aspects, this invention includes the method of preparing a cured epoxy resin characterized by the fact that when cured at ambient temperature of 20° C.-50° C., say 30° C., it is found to possess outstanding properties particularly with respect to strength and retention of strength after immersion in solvents. Curing agents falling outside the scope of this invention (such as e.g. the reaction product of itaconic acid and e.g. p-phenylene diamine—as disclosed in Paytash et al J.A.C.S 72, 1415-6 (1950)—are not satisfactory as curing accelerators for epoxy resins because they are generally high-melting solid compositions which do not readily blend in with the viscous epoxy formulation. The novel products of this invention are particularly characterized by their high compatibility with the components of the epoxy resins. The fact that they are generally liquids provides a substantial advantage to the processor.

An epoxy resin which may be cured by the process of this invention may typically be one prepared for example by the reaction of bisphenol-A with epichlorohydrin

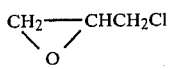

in the presence of a base—preferably sodium hydroxide. After the condensation is complete, the crude resin is freed of residual epichlorhydrin, washed well to remove salt and soluble by-products, and recovered.

Curing of 100 parts of such a resin is effected in the presence of 20-40 parts, say 30 parts of an aromatic polyamine curing agent and 1-15 parts of the accelerator of this invention in e.g. 10-30 parts, say 20 parts of a solution containing 10-50% of the accelerator of this invention.

Typical aromatic polyamine curing agent which may be employed is a condensation product of formaldehyde and aniline. (As marketed under the trademark JEFFAMINE AP-22). Illustrative curing agents may include:

TABLE methylene dianiline
diamino-diphenyl ether
meta-phenylene diamine
tolylene diamine The accelerator of this invention, preferably in the form of the free acid, is mixed with the liquid epoxy resin and curing agent; and the mixture is degassed, poured into aluminum molds, and cured typically for seven days at ambient temperature.

The product epoxy resin is particularly characterized by increased strength and by increased resistance to the deteriorative action of a wide range of liquids.

In practice of certain of its other aspects, this invention includes the method of preparing cured isocyanurate foams particularly characterized by their desirably longer cream time which desirably allows more latitude during preparation—i.e. the formulation is more mobile and handleable during a longer period of time.

An isocyanurate foam which may be cured by the process of this invention may be one prepared by reacting an isocyanate typified by a phosgenated condensation product of aniline and formaldehyde having an NCO equivalent weight of 134 and a functionality of 2.7.

The isocyanate is preferably reacted with a polyol which has two or more active hydrogen atoms as determined by the Zerewitinoff method e.g. the polyoxyalkylene polyols which may be employed in practice of this invention will be organic compounds having two or more reactive hydrogen atoms which will react with organic polyfunctional isocyanates to give urethane polymers. These polyoxyalkylene polyols typically having a hydroxyl number of 100-800 preferably 200–300, say 200, may include polyesters, polyethers, polyisocyanate modified polyesters, polyisocyanate modified polyester amides, alkylene glycols, polyamines, polyisocyanate modified alkylene glycols, etc. It will be understood that these polyols may have active primary or secondary hydroxyl groups. The polyol may be a hydroxyl-containing polyether or polyester including fatty acid glycerides. Polyesters, which are a preferred type of polyol, may be obtained by esterification condensation reaction of e.g. an aliphatic dibasic carboxylic acid with a glycol or a triol or mixture thereof in proportion such that the resultant polyesters may contain predominantly terminal hydroxyl groups. Dibasic carboxylic acids suitable for preparing polyesters may include aliphatic and aromatic acids such as adipic acid, fumaric acid, sebacic acid, phthalic acid; suitable alcohols include ethylene glycol, diethylene glycol, trimethylol propane, etc. The fatty acid glycerides may include those having a hydroxyl number of at least about 50 such as castor oils, hydrogenated castor oil, or blown natural oils.

Polyethers, another preferred type of polyol, may include polyalkylene glycols, e.g. polyethylene glycols and polypropylene glycols preferably having a molecular weight of at least 60. For convenience, the term "polyol" or "polyoxyalkylene polyol" may be employed to designate the substances having two or more active hydrogen atoms as determined by the Zerewitinoff method, which may be employed in practice of this invention.

In one aspect of the process of this invention, the isocyanurate foam may be prepared by reacting (i) an organic composition having at least two Zerewitinoff active hydrogen atoms i.e. a "polyol", (ii) an organic polyfunctional isocyanate, (iii) a cell modifying agent such as the Dow Corning DC-193 brand trimethyl-end-blocked dimethyl polysiloxane, (iv) a blowing agent such as the Kaiser R-11-B fluorocarbon, trifluoro-chloro-methane; and (v) a di-alkali metal salt of the composition of this invention.

Formation of product by practice of the process of this invention may be effected by using isocyanate and polyol in amount to provide an isocyanate index in the reaction medium of 1–10, preferably 3–6, say 5. Blowing agent is present in amount of 5–20 parts, preferably 10–14 parts, say 12 parts. Cell modifying agent is present in amount of 0.1–15 parts, preferably 0.3–0.8 parts, say 0.5 parts. Catalyst of this invention is present in amount of 0.5–10 parts, preferably 1–4 parts, say 2 parts. (All parts are parts by weight per 100 parts of total formulation).

The foamed isocyanurate product is found to be desirably characterized by cream times in excess of about 10 seconds and typically about 15 seconds, by increased heat distortion, and by substantially better dimensional stability at low temperature eg minus 20° F./dry.

DESCRIPTION OF PREFERRED EMBODIMENTS

Practice of the novel process of this invention may be apparent from the following description of preferred embodiments wherein, as elsewhere in this specification, all parts are parts by weight unless otherwise specifically noted.

EXAMPLE I

In this example which represents practice of the process of this invention, 393 grams (3 moles) of itaconic acid, 600 grams of water, and 640.5 grams of the di-terminal diamine of polyoxypropylene (molecular weight about 427, and containing 4.69 milliequivalents of primary amine per gram) are heated to reflux for 8.5 hours. Supercell filter aid is added and the reaction mixture is filtered hot and then stripped at 0.5 mm Hg in a rotary drum drier with a bath temperature of 95° C.

On cooling, a clear viscous liquid is recovered having an acidity of 3.26 milliequivalents per gram and corresponding to the following formula:

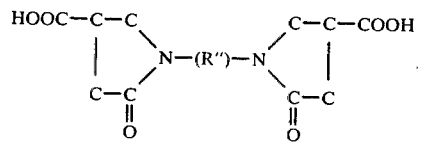

R″ is a polyoxypropylene residue (of molecular weight of about 400) having terminal carbon atoms to which the nitrogen atoms are bonded.

EXAMPLE II

In this example which represents practice of the process of this invention, 526 grams (4.03 moles) of itaconic acid, 600 grams of water, and 470 grams (2 moles) of the diterminal diamine of polyoxypropylene (molecular weight about 235, and containing 8.53 milliequivalents of primary amine per gram) are heated to reflux for 8 hours. Supercell filter aid is added and the reaction mixture is filtered hot and then stripped at 0.5 mm Hg in a rotary drum drier with a bath temperature of 95° C.

On cooling, a light, tacky flowable, viscous resin is recovered having an acidity of 4.74 milliequivalents per gram, a nitrogen content of 6.35% and corresponding to the following formula:

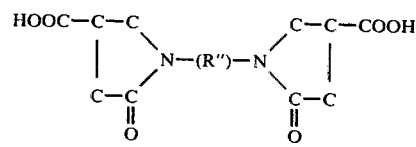

R″ is a polyoxypropylene residue (of molecular weight of about 200) having terminal carbon atoms to which the nitrogen atoms are bonded. The di-potassium salts is formed by adding 2 moles (per mole of acid) of 85% potassium hydroxide (in 20% aqueous solution) at 50° C. and filtering. The di-(tetramethylammonium) salt may be similarly prepared from tetramethylammonium hydroxide.

EXAMPLE III

In this example which represents practice of the process of this invention, 131 grams (1 mole) of itaconic acid, 100 grams of water, and 1030 grams (0.5 mole) of the di-terminal di-amine of polyoxypropylene (molecular weight about 2060, and containing 0.97 milliequivalents of primary amine per gram) are heated to reflux of 98° C.–100° C. for 19 hours. Water is removed by azeotropic distillation with 500 ml of toluene, which is added during the course of the reaction. Supercell filter aid is added and the reaction mixture is filtered hot and then stripped at 0.5 mm Hg in a rotary drum drier with a bath temperature of 138° C.

On cooling, a light brown viscous liquid is recovered having an acidity of 0.82 milliequivalents per gram and corresponding to the following formula

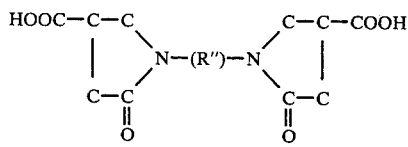

R" is a polyoxypropylene residue (of molecular weight of about 2030) having terminal carbon atoms to which the nitrogen atoms are bonded.

Results comparable to those of Examples I–III are achieved if the amine is as follows:

| Example | Amine |
|---|---|
| IV | tri-terminal tri-primary amine of polyoxypropylene of m. wt. of 400 (as marketed under the trademark Jeffamine T-403); |
| V | di-terminal di-primary amine of polyoxyethylene-polyoxypropylene of m. wt. of 600 (as marketed under the trademark Jeffamine ED-600) etc. |

EXAMPLE VI

In this example which represents practice of the process of this invention, 432 grams (3 moles) of alpha-methylene glutaric acid, 600 grams of water, and 640.5 grams of the di-terminal diamine of polyoxypropylene (molecular weight about 427, and containing 4.69 milliequivalents of primary amine per gram) are heated to reflux for 8.5 hours. Supercell filter aid is added and the reaction mixture is filtered hot and then stripped at 0.5 mm Hg in a rotary drum drier with a bath temperature of 95° C.

On cooling, there is recovered product and corresponding to the following formula:

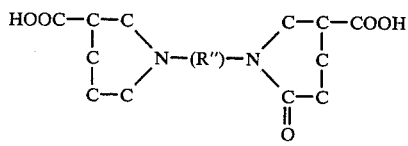

R" is a polyoxypropylene residue (of molecular weight of about 400) having terminal carbon atoms to which the nitrogen atoms are bonded.

EXAMPLE VII

In this example which represents practice of the process of this invention, 474 grams (3 moles) of alpha-methylene adipic acid, 600 grams of water, and 640.5 grams of the di-terminal diamine of polyoxypropylene (molecular weight about 427, and containing 4.69 milliequivalents of primary amine per gram) are heated to reflux for 8.5 hours. Supercell filter aid is added and the reaction mixture is filtered hot and then stripped at 0.5 mm Hg in a rotary drum drier with a bath temperature of 95° C.

On cooling, there is recovered product acid corresponding to the following formula:

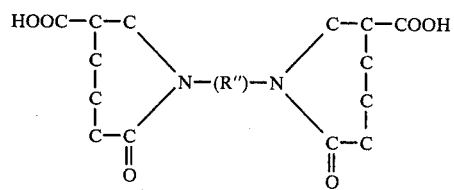

R" is a polyoxypropylene residue (of molecular weight of about 400) having terminal carbon atoms to which the nitrogen atoms are bonded.

In certain of the Examples which follow, the following properties are measured:

Cream time (seconds)—the time interval beginning with mixing of the isocyanate and the B-component (a standard mixture containing the polyol, catalyst, blowing agent, surfactant, and fire retardant) and ending when the composition changes color from dark brown to cream color;

Rise time (seconds)—the time interval beginning with mixing of the isocyanate and the B-component and ending when the foam has stopped rising;

Tack-free time (seconds)—the time interval beginning with mixing of the isocyanate and the B-component and ending when the surface of the foam ceases to be tacky when touched;

Density (pounds per cubic foot)—the weight of a given volume of the product;

K-factor (Btu .in/h.ft$^2$.°F.)—as measured by ASTM test C 177-63 using Dupont modified guarded hot plate;

Elongation at Break (%)—as measured by ASTM test D-638;

Tensile strength (psi)—as measured by ASTM test D-638;

Tensile Modulus (psi)—as measured by ASTM test D-638;

Flexural Strength (psi)—as measured by ASTM test D-790;

Flexural Modulus (psi)—as measured by ASTM test D-790;

Shore D-Hardness 0–10 seconds—as measured by ASTM test D-2240;

HDT (°C., 264 psi/66 psi)—as measured by ASTM test D-648;

Izod Impact Strength (ft lbs/in)—as measured by ASTM test D-256;

Compressive Strength (psi)—as measured by ASTM test D-1625-73;

Heat Distortion (°C.)—as measured by the temperature at which a standard sample is depressed 0.1 inches at a load corresponding to 10% of its Compressive Strength with Rise;

Closed Cells (%)—as measured by ASTM Test D-2856-70;

Dimensional Stability (%)—as measured by ASTM test D-2126-75—modified in that the sample actually used had dimension of 2"×2"×2" instead of 4"×4"×4";

Flammability—as measured by the Butler Chimney Test—ASTM test D-3019-73. Preferred practice based upon the inherent dangers due to possible flammability of various compositions including urethanes, suggest that the reader be advised that numerical or other data from this test are not intended to reflect hazards presented by this or any other material under actual fire conditions. The data represent the behavior of the tested material under specific controlled test conditions.

EXAMPLE VIII

In this example which represents practice of the process of this invention, the preparation of a cured isocyanurate foam is carried out.

A B-component is first prepared containing the following:
(i) 159 grams of polyol—a polyoxyethylene adduct of a novolak resin of hydroxyl number 187, and an average functionality of 2.5;
(ii) 3 grams of silicone surfactant—the Dow Corning DC-193 brand of trimethyl and blocked dimethyl polysiloxane;
(iii) 72 grams of fluorocarbon—the Kaiser R-11-B brand of trifluoro-chloro-methane;
(iv) 12 grams of a 50% (in polyethylene glycol of molecular weight 300) solution of the dipotassium salt of the acid product of Example I—prepared by addition to 155.4 g of the acid product of Example I in 50 ml methanol, of an equivalent amount (25.5 g) of potassium hydroxide, in 50 ml methanol (i.e. two moles of potassium hydroxide per mole of said product) and of polyethylene glycol.

To this B-component is added 354 grams of a phosgenated aniline-formaldehyde condensate of functionality 2.7 and an NCO equivalent weight of 134. The mixture is vigorously stirred and then poured into a box mold and allowed to rise.

| Property | Time (seconds) |
|---|---|
| Cream Time | 15 |
| Rise Time | 140 |
| Tack-free Time | 150 |

The properties of the product foam are listed in the table which follows Example IX*.

EXAMPLE IX*

In this control example, the procedure of Example VIII was followed except that
(i) 160.8 grams of polyol was used;
(ii) 6 grams of a 50% solution (in polyoxyethylene triol having average molecular weight of 700) of potassium octoate, a prior art curing agent, was used in place of the 12 grams of the dipotassium salt solution of Example VIII.
(iv) 358.2 grams of isocyanate was used in place of 354 grams as in Example VIII.

| Property | Time (Seconds) |
|---|---|
| Cream Time | 5-6 |
| Rise Time | 65 |
| Tack-free Time | 100 |

This control foam is less satisfactory than is the experimental foam. The cream time and the rise time in particular are much too low to be satisfactory in commercial practice. For proper commercial use, the minimum cream time in a panel-line formulation for example, should be about 12 seconds and preferably 15–20 seconds as is the case with Example VIII.

| Property | Example VIII | | | Example IX* | | |
|---|---|---|---|---|---|---|
| Density (pcf) | 2.15 | | | 2.20 | | |
| K-factor | 0.128 | | | 0.115 | | |
| Compressive strength | | | | | | |
| with rise (psi) | 36.41 | | | 36.0 | | |
| across rise (psi) | 13.39 | | | 11.39 | | |
| Heat distortion (°C.) | 202 | | | 170 | | |
| Closed cells (%) | 90.61 | | | 92.72 | | |
| Dimensional stability | | | | | | |
| | Vol. | Wt. | Linear | Vol. | Wt. | Linear |
| 158° F./100% relative humidity (%) | +9.1 | −2.8 | +5.6 | +6.7 | −4.5 | −5.0 |
| 180° F./Dry (%) | +5.9 | −1.6 | +3.9 | +5.3 | −2.4 | −3.9 |
| −20° F./Dry (%) | −4.5 | −1.4 | −2.8 | −11.4 | −5.9 | −6.8 |
| Butler Chimney Test: | | | | | | |
| Weight retained (%) | 85.6 | | | 90.7 | | |
| Time to extinguish (seconds) | 14 | | | 10.7 | | |
| Flame height (inches) | 11+ | | | 8.16 | | |
| Friability (% weight loss) | 8.5 | | | 5.4 | | |

The clear superiority of the foam of Example VIII over that of Example IX* is apparent. In addition to the above comments, particular attention is directed to the generally superior properties including (i) improved heat distortion, (ii) volume and linear dimensional stability at low temperature, (iii) weight stability, etc.

EXAMPLE X

In this example which represents practice of the process of this invention, the preparation of a cured epoxy resin is carried out.

The uncured epoxy resin (100 grams) which is used as charge is identified as a liquid diglycidylether glycol ester of bisphenol A epoxy resin Eq. Wt. 190.

Curing of the so-prepared epoxy resin (100 g) is effected by addition thereto of
(i) 30 parts of a condensation product of formaldehyde and aniline of equivalent weight 50, a polyaromatic polyamine curing agent, (marketed under the trademark JEFFAMINE AP-22).
(ii) 20 parts of a 20 w % solution in benzyl alcohol of the accelerator composition prepared by the process of Example I.

This mixture of components was mixed thoroughly, degassed, poured into aluminum molds, and cured for seven days at ambient conditions ca 25° C.

The properties of the Formulation were determined on samples cut from the castings.

| Properties of cured ⅛" casting | Value |
|---|---|
| Izod impact strength (ft-lbs/in.) | 0.61 |
| Tensile strength (psi) | 9,300 |
| Tensile modulus (psi) | 404,000 |
| Elongation at break (%) | 5.1 |
| Flexural strength (psi) | 15,000 |
| Flexural modulus (psi) | 424,000 |
| Shore D Hardness (0–10 sec.) | 86–84 |
| HDT (°C., 264 psi/66 psi) | 44/48 |

Flexural samples were cut and immersed in several chemicals for 28 days. All tests were conducted at ambient temperature of ca 25° C. except that in distilled water which was carried out at 40° C. After removal from the chemicals, flexural strength of the immersed samples was determined. Pertinent retention of flexural strength was then computed with the following results:

| Sample immersed in | % Retention of Flexural Strength |
| --- | --- |
| Isopropanol | 104 |
| Xylene | 104 |
| Acetic acid (25%) | 89 |
| Sodium Hydroxide (50%) | 115 |
| Sulfuric acid (30%) | 102 |
| Distilled water | 88 |

It will be apparent from inspection of the above properties that the cured epoxy formulations are outstanding with respect to strength and retention of strength after immersion in various chemicals.

EXAMPLE XI*

In this control example, the procedure of Example X is duplicated except that curing is carried out in the absence of the accelerator.

After seven days cure at ambient temperature, the formulations were so brittle and undercured that it was not possible to cut samples for the tests from the castings. It was apparent that the formulations were totally unsatisfactory and of low strength.

EXAMPLES XII–XIII*

A liquid accelerating mixture for use in conjunction with aromatic amine curatives is prepared by dissolving 20 g. polyoxypropylene-alpha, omega Bis (pyrrolidinone-3-carboxylic acid) in 80 g benzyl alcohol.

The above mixture is combined into an epoxy system as follows

| Formulation: | |
| --- | --- |
| Liquid DGEBA epoxy resin (Equivalent weight 190) | 100 parts |
| Aromatic polyamine Jeffamine AP-22 brand of the condensation product of formaldehyde and aniline | 30 parts |
| Accelerator mixture described above | 20 parts |

The formulation is mixed thoroughly degassed and poured into aluminum molds and cured for seven days under ambient conditions. The castings are then cut into samples and tested with the following results:

| Properties of cured ⅛" casting: | |
| --- | --- |
| IZOD impact strength ft.-lbs./in. | 0.61 |
| Tensile strength, psi | 9300 |
| Tensile modulus, psi | 404000 |
| Elongation at break, % | 5.1 |
| Flexural strength, psi | 15000 |
| Flexural modulus, psi. | 424000 |
| Shore D hardness, 0–10 sec. | 86.84 |
| HDT, °C. 264 psi/66 psi | 44/48 |

Flexural samples were cut and immersed in several chemicals for 28 days. After removal from the chemicals, flexural strength of the immersion samples was determined. Percent retention of flexural strength was then computed with the following results—

| Sample immersed in | Percent Retention, Flex. strength |
| --- | --- |
| Isopropanol, R.T. | 104 |
| Xylene, RT. | 104 |
| Acetic acid, 25% R.T. | 89 |
| Sodium hydroxide 50%, R.T. | 115 |
| Sulfuric acid, 30%, R.T. | 102 |
| Distilled water, 40° C. | 88 |

Castings cured without the accelerator mixture (Example XIII*) were brittle and undercured after 7 days curing at ambient temperatures. Samples could not be cut from such castings. In contrast the castings cured with the accelerator mixture (Example XII) were properly cured, not brittle and readily cuttable.

R.T. means Room Temperature.

Although this invention has been illustrated by reference to specific embodiments, it will be apparent to those skilled in the art that various changes and modifications may be made which clearly fall within the scope of the invention.

We claim:

1.

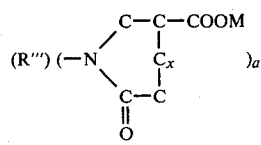

wherein x is an integer 1–2; a is an integer 2–3; M is hydrogen, alkali metal, or quaternary ammonium when x is 1 or 2; R''' is a polyoxyalkylene chain having terminal carbon atoms to which the nitrogen atoms are bonded; and the molecular weight of R''' is 200–2100.

2.

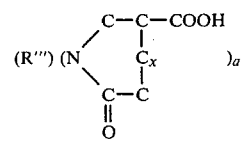

wherein x is an integer 1–2, a is an integer 2–3; R''' is a polyoxyalkylene chain having terminal carbon atoms to which the nitrogen atoms are bonded; and the molecular weight of R''' is 300–2100.

3. A compound as claimed in claim 2 wherein the molecular weight of R''' is 400–2100.

4.

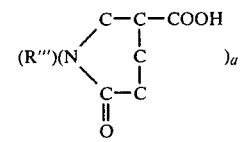

wherein a is an integer 2–3; R''' is a polyoxyalkylene chain having terminal carbon atoms to which the nitrogen atoms are bonded; and the molecular weight of R''' is 200–2100.

5.

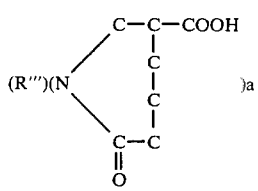

wherein a is an integer 2-3; R''' is a polyoxyalkylene chain having terminal carbon atoms to which the nitrogen atoms are bonded; and the molecular weight of R''' is 200–2100.

6.

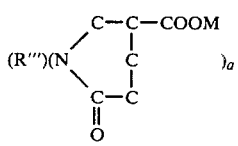

wherein a is an integer 2-3; R''' is a polyoxyalkylene chain having terminal carbon atoms to which the nitrogen atoms are bonded; and the molecular weight of R''' is 200–2100; and M is alkali metal or quaternary ammonium.

7.

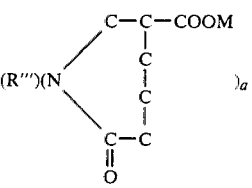

wherein a is an integer 2-3; R''' is a polyoxyalkylene chain having terminal carbon atoms to which the nitrogen atoms are bonded; and the molecular weight of R''' is 200–2100; and M is alkali metal or quaternary ammonium.

8.

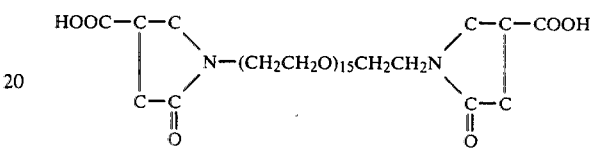

9.

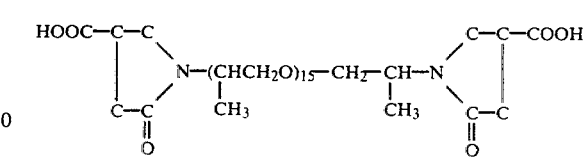

* * * * *

UNITED STATES PATENT AND TRADEMARK OFFICE
CERTIFICATE OF CORRECTION

PATENT NO. : 4332720

DATED : June 1, 1982

INVENTOR(S) : Heinz Schulze, Robert L. Zimmerman and Harold G. Waddill

It is certified that error appears in the above—identified patent and that said Letters Patent is hereby corrected as shown below:

Column 9, line 45, correct the formula to read:

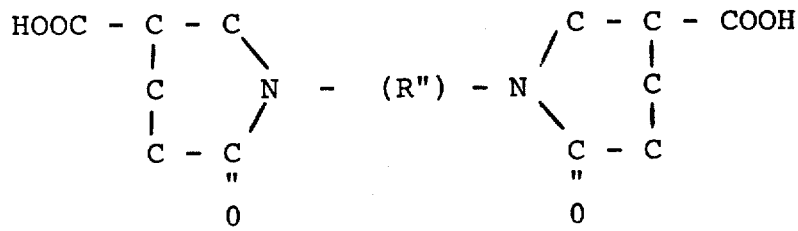

Signed and Sealed this

Seventh Day of September 1982

|SEAL|

Attest:

GERALD J. MOSSINGHOFF

Attesting Officer

Commissioner of Patents and Trademarks